(12) United States Patent
Hamada et al.

(10) Patent No.: US 8,374,195 B2
(45) Date of Patent: *Feb. 12, 2013

(54) DATA TRANSMISSION APPARATUS AND METHOD, DATA RECEIVING APPARATUS AND METHOD, AND DATA TRANSMISSION AND RECEPTION SYSTEM AND METHOD

(75) Inventors: Ichiro Hamada, Kanagawa (JP); Keiji Yuzawa, Saitama (JP)

(73) Assignee: Sony Corporation, Tokyo (JP)

( * ) Notice: Subject to any disclaimer, the term of this patent is extended or adjusted under 35 U.S.C. 154(b) by 410 days.

This patent is subject to a terminal disclaimer.

(21) Appl. No.: 12/434,171

(22) Filed: May 1, 2009

(65) Prior Publication Data
US 2009/0235362 A1    Sep. 17, 2009

Related U.S. Application Data

(60) Continuation of application No. 10/899,692, filed on Jul. 27, 2004, now Pat. No. 7,548,555, which is a division of application No. 09/356,095, filed on Jul. 16, 1999, now Pat. No. 6,792,007.

(30) Foreign Application Priority Data

Jul. 17, 1998   (JP) .................................. P10-204006

(51) Int. Cl.
*H04L 12/66* (2006.01)
(52) U.S. Cl. ...................................... 370/463
(58) Field of Classification Search ................ 370/259, 370/463, 252, 254, 429, 229, 241; 726/26, 726/21, 2, 27, 4, 28, 30, 29, 34, 1; 713/161, 713/170, 165, 168, 176; 725/34, 49, 53, 725/55, 2, 37, 39
See application file for complete search history.

(56) References Cited

U.S. PATENT DOCUMENTS

| 5,400,401 | A | 3/1995 | Wasilewski et al. |
|---|---|---|---|
| 5,477,263 | A | 12/1995 | O'Callaghan et al. |
| 5,481,542 | A | 1/1996 | Logston et al. |
| 5,552,833 | A | 9/1996 | Henmi et al. |
| 5,574,505 | A | 11/1996 | Lyons et al. |
| 5,594,789 | A | 1/1997 | Seazholtz et al. |
| 5,619,425 | A | 4/1997 | Funahashi et al. |
| 5,862,219 | A | 1/1999 | Glaab |
| 5,920,572 | A | 7/1999 | Washington et al. |

(Continued)

FOREIGN PATENT DOCUMENTS

| EP | 0 849 948 A2 | 6/1998 |
|---|---|---|
| EP | 0 896 333 A2 | 2/1999 |

(Continued)

OTHER PUBLICATIONS

EBU Project Group B/CA: "Functional model of a conditional access system", EBU Review Technical, Dec. 1995, pp. 64-77, XP559450, Grand-Saconnex, CH.

*Primary Examiner* — Kwang B Yao
*Assistant Examiner* — Anh Ngoc Nguyen
(74) *Attorney, Agent, or Firm* — Oblon, Spivak, McClelland, Maier & Neustadt, L.L.P.

(57) ABSTRACT

The protection of data against illicit transfer with respect to specific data can be ensured. An integrated receiver decoder determines whether or not ATRAC (Adaptive Transform Acoustic Coding) data requiring authentication is contained in selected piece-of-music data in accordance with determination data added into transmitted data. When ATRAC data requiring authentication is contained, the integrated receiver decoder performs an authentication process between it and a storage which is a transfer destination of the ATRAC data, and performs downloading of the ATRAC data after confirming that the storage is a valid apparatus to which the downloading may be performed.

17 Claims, 13 Drawing Sheets

U.S. PATENT DOCUMENTS

| | | | |
|---|---|---|---|
| 5,954,817 A * | 9/1999 | Janssen et al. | 713/169 |
| 5,983,005 A * | 11/1999 | Monteiro et al. | 709/231 |
| 6,034,732 A | 3/2000 | Hirota et al. | |
| 6,037,995 A | 3/2000 | Ichifuji et al. | |
| 6,061,449 A * | 5/2000 | Candelore et al. | 380/28 |
| 6,175,577 B1 | 1/2001 | Van Den Heuvel | |
| 6,182,287 B1 * | 1/2001 | Schneidewend et al. | 725/48 |
| 6,298,441 B1 * | 10/2001 | Handelman et al. | 713/185 |
| 6,445,875 B1 | 9/2002 | Akagiri et al. | |
| 6,523,125 B1 * | 2/2003 | Kohno et al. | 713/320 |
| 6,684,400 B1 | 1/2004 | Goode et al. | |
| 7,131,133 B1 * | 10/2006 | Kawakura et al. | 725/25 |
| 7,548,555 B2 * | 6/2009 | Hamada et al. | 370/463 |
| 2001/0052126 A1 * | 12/2001 | Nanki et al. | 725/55 |
| 2003/0188307 A1 | 10/2003 | Mizuno | |

FOREIGN PATENT DOCUMENTS

| | | |
|---|---|---|
| EP | 0 918 408 A2 | 5/1999 |
| JP | 09-121340 | 5/1997 |
| JP | 10-021305 | 1/1998 |
| WO | 97/50250 | 12/1997 |

* cited by examiner

FIG. 9

| CLUSTER | SECTOR FF 0 0 ... ...1F | |
|---|---|---|
| 0 | | BUFFER AREA |
| 1 | | |
| 2 | | Power Calibration Area |
| 3 | | |
| 4 | | User Table Of Contents |
| 5 | | |
| 6 | | BUFFER AREA |
| 7 | | |
| 8 | | Aux TOC |
| 9 | | |
| 10 | | BUFFER AREA |
| 11 : 48 | | Aux Date 2.8Mbyte (Mode 2) |
| 49 | | BUFFER AREA |
| 50 : : 2251 | Sub Data | Main Data (ATRAC NOW IN USE) 74 MINUTES AT MAXIMUM |

JPEG STILL IMAGE
LYRICS INFORMATION
VARIOUS TEXT INFORMATION

DATA TRANSMISSION APPARATUS AND METHOD, DATA RECEIVING APPARATUS AND METHOD, AND DATA TRANSMISSION AND RECEPTION SYSTEM AND METHOD

CROSS-REFERENCE TO RELATED APPLICATION

This application is a continuation of U.S. application Ser. No. 10/899,692, filed on Jul. 27, 2004, entitled "Data Transmission Apparatus And Method, Data Receiving Apparatus And Method, And Data Transmission And Reception System And Method", which is a division of U.S. application Ser. No. 09/356,095, now U.S. Pat. No. 6,792,007, filed Jul. 16, 1999, entitled, "Data Transmission Apparatus And Method, Data Receiving Apparatus And Method, And Data Transmission And Reception System And Method", the entire disclosures of which are hereby incorporated by reference herein.

BACKGROUND OF THE INVENTION

The present invention relates to a data transmission apparatus and method, a data receiving apparatus and method, and a data transmission and reception system and method, which are used for transmission and reception of data.

In recent years, digital signals are becoming increasingly used for transmission and recording of audio and image data. For example, in digital satellite broadcasts, digital signals are compressed and transmitted through the use of satellites. The digital satellite broadcast is highly resistant to noise and fading and can transmit higher-quality signals in comparison with existing analog broadcasts. Also, recently, as typified by optical disks, magneto-optic disks, etc., recording media capable of recording digital signals have been developed in increasing numbers. As a result, for example, it has become possible to digitally record digital signals transmitted by the above-mentioned digital satellite broadcast in an ordinary household. Furthermore, it is also possible to digitally record digital signals played back from a recording medium, such as an optical disk, for digital data through a bus, etc.

In the meantime, in digital signals, since signal deterioration barely occurs during the transmission of signals, it is possible to copy data at a quality which is essentially equivalent to that of the original. For this reason, the risk of illicit data copying is high, and protection of copyrights might not be ensured.

Accordingly, methods for protecting digital data have been conventionally proposed. For example, there is a method for setting a flag, which prohibits copying of data, in data to be transmitted. This is such that, on the data transmission side, when data from which copying should be prohibited is to be transmitted, data is transmitted with the flag which prohibits copying being set, and in the recording apparatus on the receiving side, apparatus control is performed such that recording of data is prohibited according to the setting or non-setting of the flag. In this case, for example, at the first copying of data, the flag for copying prohibition is not set, and for example, the flag is set when a recording medium in which data is copied is copied onto another recording medium. As a result, one-time-only copying is possible, but copying of data is not possible from the copied recording medium to a second or subsequent medium.

However, in the method for setting a flag in data in a manner as described above, there is a problem in that protection of data cannot be sufficiently ensured unless the recording apparatus on the receiving side is designed to handle processing of the flag. That is, when there is an apparatus which can receive data without recognizing the flag and which can record the data, the protection of the copyright cannot be ensured. Also, if the flag is rewritten by using a computer, any number of copies can be made.

In the meantime, in recording media for digital data, which are commercially available, a method is adopted in which data is compressed by a predetermined compression method and is recorded. When such digital signals recorded in recording media are to be digitally recorded on another recording medium through a bus, etc., usually, compressed data is once decoded into non-compressed data on the data transmission side, and the data is compressed again on the data receiving side and digital recording is performed. When compression of data is repeated several times in this manner, deterioration of data may occur, depending upon the performance of the apparatus which compresses the data.

However, in recent years, a method has been proposed in which received compressed data is digitally recorded on a recording medium as it is without decoding or compressing the data. In the case of this method, since a data compression process needs not be performed on the recording side, signal deterioration barely occurs in practice during the recording of the data. Therefore, with regard to such a method, in particular, it is necessary to focus on protecting copyrights.

SUMMARY OF THE INVENTION

The present invention has been achieved in view of such problems. An object of the present invention is to provide a data transmission apparatus and method, a data receiving apparatus and method, and a data transmission and reception system and method, which are capable of ensuring the protection of data with respect to illicit transfer of specific data.

In accordance with an embodiment of the present invention, a signal processing method is provided. The methods comprises receiving a multiplexed signal; selecting a program from the received multiplexed signal; obtaining a program map table associated with the program; obtaining packet identification information of image data associated with the program; obtaining packet identification information of audio data associated with the program; obtaining packet identification information of user interface data associated with the program from the program map table; and outputting the user interface data, the image data and the audio data.

In one alternative, outputting the image data includes displaying the image data on a display. In another alternative, outputting the audio data includes playing the audio data through an output terminal. In yet another alternative, the program is an audio program. In this case, the image data is preferably selected from the group consisting of jacket image data, artist profile information and lyrics data. In a further alternative, the method further comprises downloading the program to an external storage device. In this case, the method preferably further comprising enabling a user to preview the program prior to the downloading step.

In accordance with another embodiment of the present invention, a signal processing method is provided. The method comprises receiving a multiplexed signal at a receiving apparatus; selecting an audio program from among a plurality of programs in the received multiplexed signal; obtaining identification information for the selected audio program from user interface data in the received multiplexed signal; searching for a descriptor corresponding to the identification information from a program map table of an audio channel; selecting a portion of the program map table associated with the selected audio program; determining whether authentication is required before downloading the selected audio program to an external storage device; and downloading the selected audio program.

In one alternative, if it is determined that authentication is required, the method further comprises performing authentication between the receiving apparatus and the external storage device. In another alternative, the selected audio program is in an ATRAC format. In a further alternative, the selected audio program is in an MPEG format.

In the data transmission apparatus and method in accordance with the present invention, a plurality of types of data for transmission are created, and when specific data which requires, in a transmission destination, an authentication process for confirming the validity of an apparatus of a data transfer destination is contained in this data for transmission, determination data used to determine that the specific data is contained is created, and the created data is transmitted.

In the data receiving apparatus and method in accordance with the present invention, a plurality of types of data for transmission are received and, when specific data which requires, in a transmission destination, an authentication process for confirming the validity of an apparatus of a data transfer destination is contained in this data for transmission, determination data used to determine that the specific data is contained is received; and it is determined whether or not the specific data is contained in the data for transmission on the basis of the received determination data.

In the data transmission and reception system and method in accordance with the present invention, a plurality of types of data for transmission are created and, when specific data which requires, in a transmission destination, an authentication process for confirming the validity of an apparatus of a data transfer destination is contained in this data for transmission, determination data used to determine that the specific data is contained is created; the created data is transmitted; the transmitted data is received; and it is determined whether or not the specific data is contained in the data for transmission on the basis of the determination data contained in the received data.

The above and further objects, aspects and novel features of the invention will become more apparent from the following detailed description when read in connection with the accompanying drawings.

BRIEF DESCRIPTION OF THE DRAWINGS

FIG. 9 is a diagram showing the recording format of the IEEE1394MD in FIG. 6.

DETAILED DESCRIPTION

An embodiment of the present invention is described below in detail with reference to the drawings.

The system of the present invention is one in which a music program is broadcast by a digital satellite broadcast, and audio data for this music program is streamed, making it possible for a viewer-listener to test-listen it, and furthermore, when there is a piece of music that the viewer-listener likes after test-listening, that piece of music can be purchased easily and immediately.

Figure 1:
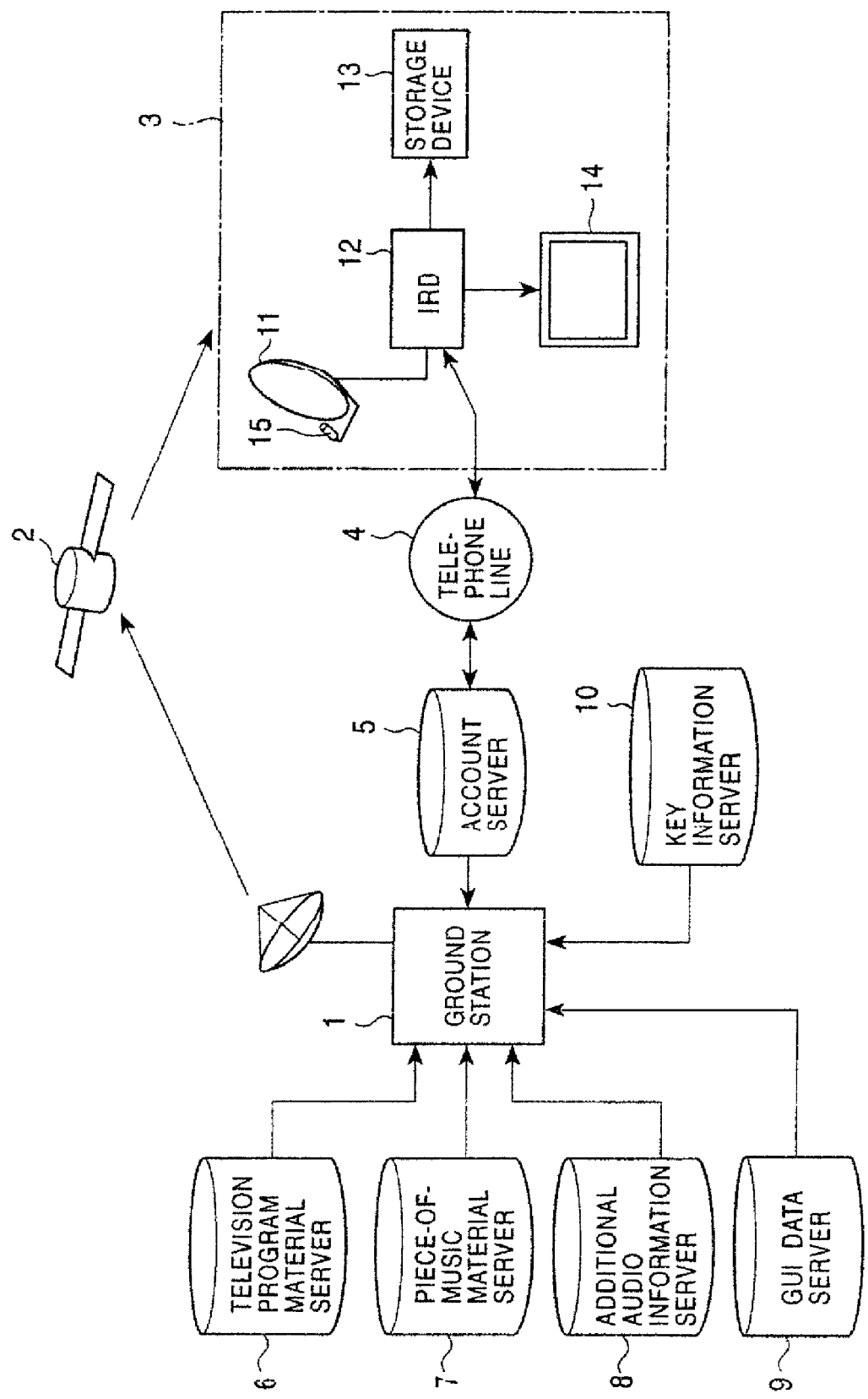
FIG. 1 is a block diagram showing the overall construction of a system of the present invention.

FIG. 1 shows the overall construction of a music content streaming system as a data transmission and reception system of the present invention. This music content streaming system comprises a ground station 1 for a digital satellite broadcast, which multiplexes various signals and transmits it to a satellite 2, an account server 5 connected to this ground station 1, a television program material server 6, a piece-of-music material server 7, an additional audio information server 8, a graphical-user-interface (hereinafter referred to as a "GUI") data server 9, and a key information server 10. The satellite 2 transmits signals transmitted from the ground station 1 toward the ground. The satellite 2 is equipped with a plurality of transponders. One transponder has transmission performance of, for example, 30 Mbps.

The music content streaming system further comprises receiving equipment 3, for example, for each household, for receiving signals transmitted from the ground station 1 via the satellite 2. The receiving equipment 3 comprises a parabolic antenna 11 for receiving signals from the satellite 2, a low-noise block downconverter (hereinafter referred to as an "LNB") 15 which is a converter for converting signals received by this parabolic antenna 11 into signals of a predetermined frequency, an integrated receiver decoder (hereinafter referred to as an "IRD") 12 as a receiver which inputs an output signal of this LNB 15, and a storage device 13 and a television receiver 14, which are connected to this IRD 12 The IRD 12 is connected to the account server 5 through, for example, a telephone line 4.

In the music content streaming system constructed in this manner, material for a television program broadcast from the television program material server 6, material for piece-of-music data from the piece-of-music material server 7, additional audio information from the additional audio information server 8, and GUT data from the GUT data server 9 are sent to the ground station 1 for a digital satellite broadcast.

The television program material server 6 is a server which provides material for normal music broadcast programs. The materials of a music broadcast sent from this television program material server 6 are moving pictures and audio. In a normal music broadcast program, for example, moving pictures and audio for the promotion of a new piece-of-music introduction are broadcast, and the count-down of up-to-date hit songs is broadcast.

The piece-of-music material server 7 is a server which provides an audio program by using audio channels. The material for this audio program is audio only. This piece-of-music material server 7 sends the materials of the audio programs of a plurality of audio channels to the ground station 1. In the program broadcasts in each audio channel, the same piece of music is repeatedly broadcast at a predetermined unit time. The respective audio channels are independent of each other, and various methods of use thereof are conceivable. For example, in one audio channel, a recommended piece of music of current Japanese pop may be repeatedly broadcast for a predetermined time; in another audio channel, a recommended piece of music of current American pop may be repeatedly broadcast for a predetermined time; and in still another audio channel, a recommended piece of music of jazz may be repeatedly broadcast for a predetermined time. Also, a plurality of pieces of music of the same artist may be divided between the respective audio channels and may be repeatedly broadcast.

The additional audio information server 8 provides additional audio information. This additional audio information is time information of the piece of music output from the piece-of-music material server 7, specifically, information of the total performance time of the piece of music and the time elapsed after the performance of the piece of music has started.

The GUI data server 9 provides data for forming a screen for a list page of pieces of music to be streamed and an information page for each piece of music, data for forming still-image data for a record jacket, data for the lyrics of the piece of music to be streamed, data for forming a screen for an electric program guide (hereinafter referred to as an "EPG), etc. As the details will be described later, in the system of the present invention, by operating GUI on the screen, the lyrics for the piece of music to be streamed, concert information for artists, etc., can be displayed on the screen. Also, by operating GUI on the screen, a piece of music can be selected, downloaded, reserved, etc. Data for that purpose is sent from the GUI data server 9. For this GUI data, for example, an MHEG (Multimedia and Hypermedia Information Coding Experts Group) method is used.

The ground station 1 multiplexes video data and audio data which are material of a music program broadcast from the television program material server 6, audio data which is material for an audio channel from the piece-of-music material server 7, additional audio information from the additional audio information server 8, and GUI data from the GUI data server 9, and transmits it. At this time, the video data for the television program broadcast is compressed by, for example, an MPEG2 (Moving Picture Experts Group) method, and the audio data for a television program broadcast is compressed by an MPEG audio method. The audio data of each audio channel is compressed by two different methods, for example, an MPEG audio method and an ATRAC (Adaptive Transform Acoustic Coding) method. Also, this data is encrypted, during multiplexing, using key information from the key information server 10.

The signal from the ground station 1 is received, for example, by the parabolic antenna 11 for the receiving equipment 3 of each household via the satellite 2. This received signal is converted into a predetermined frequency by the LNB 15 and is supplied to the IRD 12.

The IRD 12 selects a signal of a predetermined channel from the received signal in order to perform demodulation of video data and audio data. Also, the IRD 12 forms a list page of pieces of music to be streamed, an information page for each piece of music, and a screen for an EPG. The output signal of the IRD 12 is supplied to the television receiver 14.

The storage device 13 is used to store downloaded audio data. For example, as the storage device 13, an MD (Mini Disk) recorder-player, a DAT (digital audio tape) recorder-player, a DVD (digital video disk or digital versatile disk) recorder-player, etc., may be used. Furthermore, it is also possible to use a personal computer as the storage device 13 and to store audio data on a hard disk or a CD-R (recordable compact disk) thereof.

The IRD 12 is connected to the account server 5 via, for example, the telephone line 4. An IC card storing various information is inserted into the IRD 12. When the download of audio data of a piece of music is performed, the information is stored in the IC card. The information in this IC card is sent to the account server 5 via, for example, the telephone line 4. The account server 5 performs appropriate accounting on the basis of this download information and charges the viewer-listener. In this manner, by performing appropriate accounting, it is possible to protect the copyright of the piece of music to be downloaded.

In a manner as described above, in the system of the present invention, the ground station 1 multiplexes video data and audio data which are material for a music program broadcast from the television program material server 6, audio data which is material for an audio channel from the piece-of-music material server 7, additional audio information from the additional audio information server 8, and GUI data from the GUT data server 9, and transmits it. Then, when this broadcast is received by the receiving equipment 3 of each household, a music program can be viewed, and furthermore, a GUI screen is displayed based on the received GUI data. By performing a necessary operation while viewing this GUT screen, the viewer-listener can view the information page for each piece of music and also can test-listen each piece of music. Furthermore, by performing necessary operations while viewing the GUT screen, it is possible for the viewer-listener to download the audio data of a desired piece of music and to store it in the storage device 13.

Next, a more detailed description is given of an operation by a viewer-listener on the receiving equipment 3.

Figure 2:
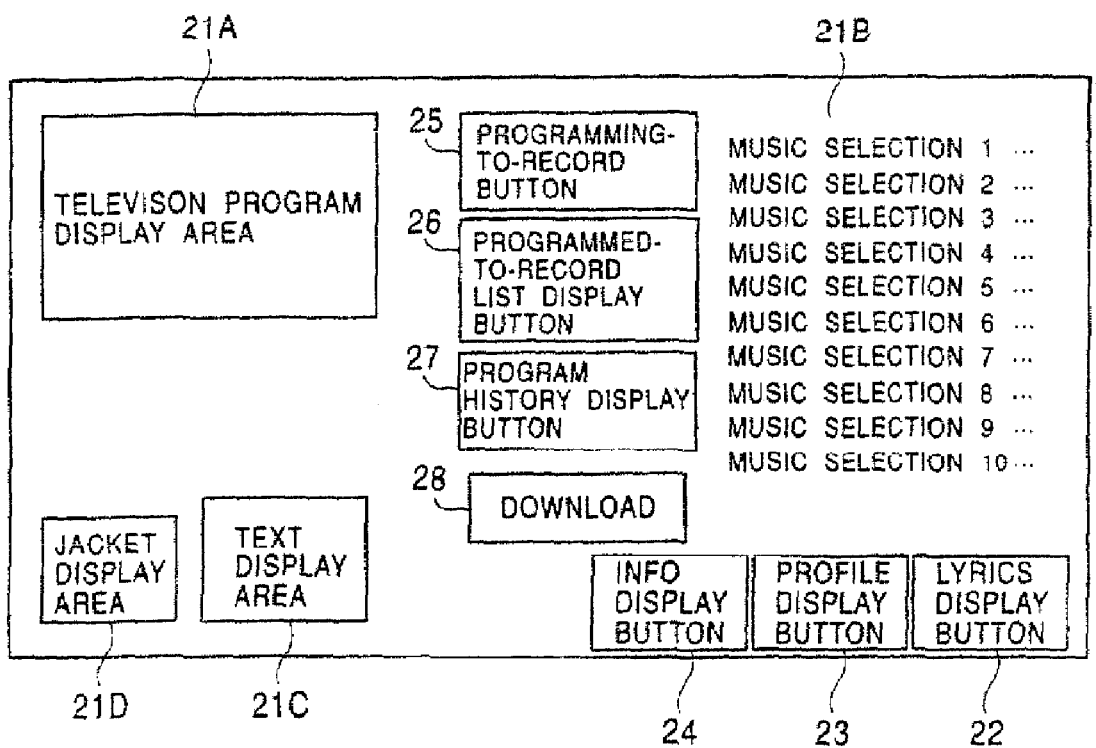
FIG. 2 is an illustration showing an example of a screen which is displayed on a television receiver in the system shown in FIG. 1.

When the above-mentioned music program broadcast is received by the receiving equipment 3 of each household, a GUI screen such as that shown in FIG. 2 is displayed on the television receiver 14. In a television program display area 21A in the upper left portion of this screen, a moving picture based on a music program provided from the television program material server 6 is displayed. In the upper right portion of the screen, a list 21B of the pieces of music of each channel broadcast in an audio channel is displayed. Also, in the lower left portion of the screen, a text display area 21C and a jacket display area 21D are set. Furthermore, on the right side of the screen, a lyrics display button 22, a profile display button 23, an information display button 24, a programming-to-record button 25, a programmed-to-record list display button 26, a program history display button 27, and a download button 28 are displayed.

The viewer-listener looks for a piece of music the viewer-listener is interested in while viewing the names of the pieces of music displayed in the list 21B. Then, when the viewer-listener finds a piece of music the viewer-listener is interested in, after the cursor is set to the piece of music by operating the arrow keys of the remote controller, the enter key of the remote controller attached to the IRD 12 is pressed. This makes it possible to test-listen the piece of music on which the cursor is set. That is, in each audio channel, since the same piece of music is repeatedly broadcast within a predetermined unit of time, switching is made to the audio channel of the piece of music with the screen of the television program display area 21A being maintained as it is, and the piece of music can be listened to. At this time, in the jacket display area 21D, the still image of the MD jacket of the piece of music is displayed.

When the cursor is set to the lyrics display button 22 in this state and the enter key is pressed (hereinafter, the operation of setting the cursor to the button and pressing the enter key is referred to as "pressing the button"), the lyrics of the piece of music are displayed in the text display area 21C at a timing synchronized with the audio data. In a similar manner, when the profile display button 23 or the information display button 24 is pressed, the profile of the artist, concert information, etc., corresponding to the piece of music, are displayed in the text display area 21C. In a manner as described above, it is possible for the viewer-listener to be informed of what kind of piece of music is being streamed currently and to be informed of the detailed information of each piece of music.

When the viewer-listener wishes to purchase the piece of music the viewer-listener has test-listened, the viewer-listener presses the download button 28. When the download button 28 is pressed, the audio data of the selected piece of music is downloaded and stored in the storage device 13. Together with the audio data of the piece of music, the lyrics data thereof, the profile information of the artist, the still-image data of the jacket, etc., can also be downloaded. Each time a piece of music is downloaded, the information is stored in the IC card within the IRD 12. The information stored in the IC card is stored by the account server 5, for example, once a month. This makes it possible to protect the copyright of the pieces of music to be downloaded.

Furthermore, when the viewer-listener wants to program downloads, the viewer-listener presses the programming-to-record button 25. When this button 25 is pressed, the GUI screen is switched, and a list of pieces of music which can be programmed to be recorded is displayed on the entire screen. It is possible for this list to display searched pieces of music in units of one hour, one week, by genre, etc. When the viewer-listener selects, from this list, a piece of music for which reservation of downloading is desired, the information is entered into the IRD 12. Also, when it is desired to confirm the piece of music for which reservation of downloading has already been made, by pressing the programmed-to-record list display button 26, the list of the reserved pieces of music which are programmed to be recorded can be displayed on the entire screen. The piece of music reserved in this manner is downloaded by the IRD 12 when the reserved time comes and is stored in the storage device 13.

When the viewer-listener wants to confirm the downloaded piece of music, by pressing the program history display button 27, the list of pieces of music which have already been downloaded can be displayed on the entire screen.

In a manner as described above, in the receiving equipment 3 in the system of the present invention, a list of pieces of music is displayed on the GUI screen of the television receiver 14. Then, when the viewer-listener selects a piece of music according to the display on the GUI screen, the viewer-listener can test-listen the piece of music, and further, can be informed of the lyrics of the piece of music, the profile of the artist, etc. In addition, the viewer-listener can download a piece of music, make a reservation therefor, and display the history of downloading and the reserved pieces-of-music list, etc., by using the GUI screen.

As has been described up to this point, in the music content streaming system of the present invention, a music broadcast program is streamed, and audio data of a piece of music is streamed by using a plurality of audio channels. Then, a desired piece of music can be searched for using a list of pieces of music being streamed, etc., and the audio data can be stored easily in the storage device 13. Such a system is described below in more detail.

Figure 3:
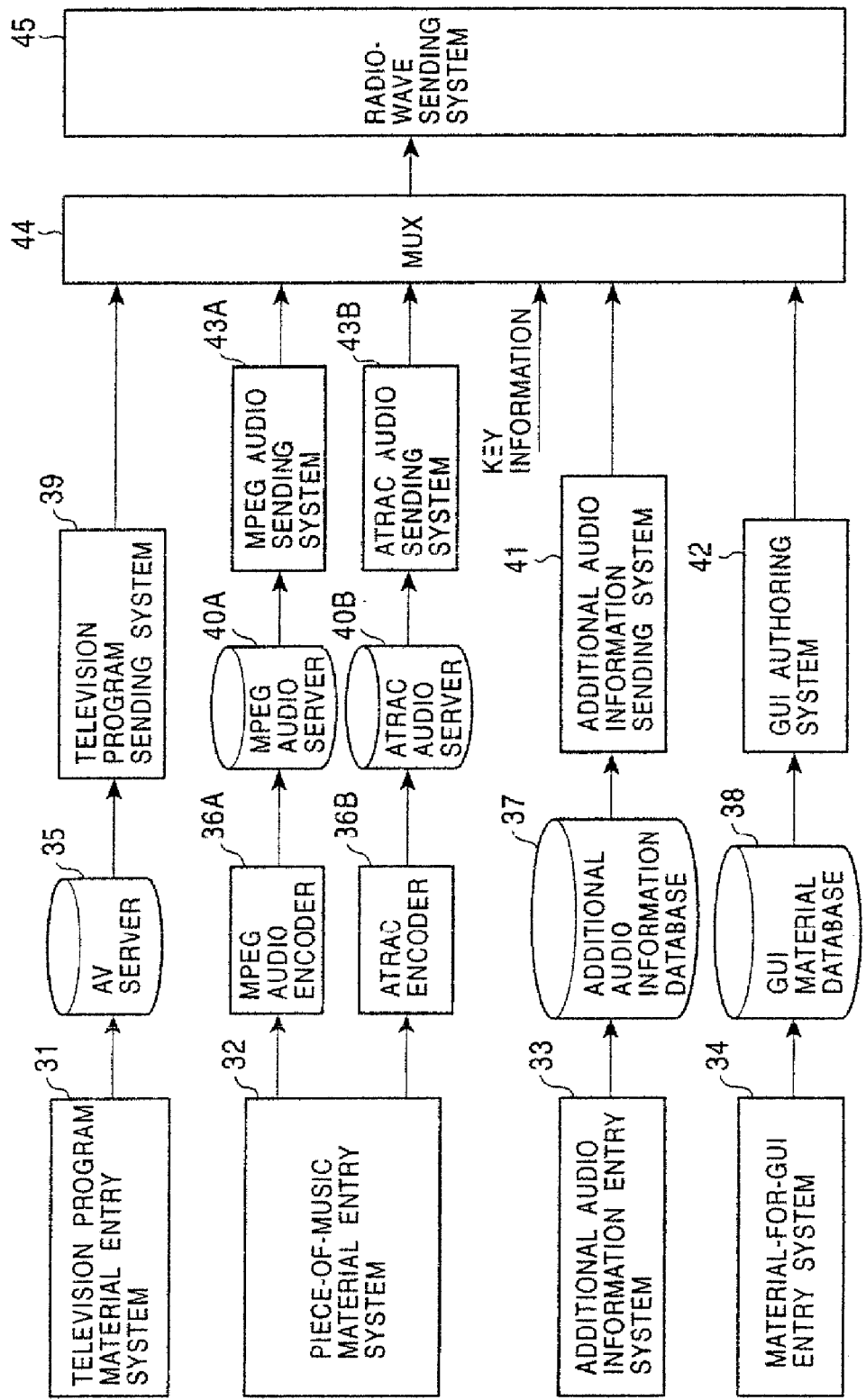
FIG. 3 is a block diagram showing an example of the construction of a ground-wave station in the system shown in FIG. 1.

FIG. 3 shows an example of the construction of the ground station 1 in the music content streaming system of the present invention.

This ground station 1 comprises a television program material entry system 31 for entering material data from the television program material server 6, a piece-of-music material entry system 32 for entering audio data from the piece of music material server 7, an additional audio information entry system 33 for entering additional audio information from the additional audio information server 8, and a material-for-GUI entry system 34 for entering GUI data from the GUI data server 9.

The ground station 1 further comprises an AV (Audio Visual) server 35 for holding material data from the television program material entry system 31, and a television program sending system 39 for compressing material data held by this AV server 35, forming it into packets, and sending them.

The ground station 1 further comprises an MPEG audio encoder 36A for encoding audio data from the piece-of-music material entry system 32 by an MPEG audio method, an MPEG audio server 40A for holding MPEG audio data which is obtained as a result of being encoded by this MPEG audio encoder 36A, and an MPEG audio sending system 43A for forming the MPEG audio data held by this MPEG audio server 40A into packets and for sending them.

The ground station 1 further comprises an ATRAC encoder 3613 for encoding audio data from the piece-of-music material entry system 32 by an ATRAC method, an ATRAC audio server 40B for holding ATRAC data obtained as a result of being encoded by this ATRAC encoder 36B, and an ATRAC audio sending system 43B for forming the ATRAC data held by this ATRAC audio server 40B into packets and for sending them.

The ground station 1 further comprises an additional audio information database 37 for holding additional audio information from the additional audio information entry system 33, and an additional audio information sending system 41 for forming the additional audio information held by this additional audio information database 37 into packets and for sending them.

The ground station 1 further comprises a GUI material database 38 for holding GUI data from the material-for-GUI entry system 34, and a GUI authoring system 42 for processing GUI data held by this GUI material database 38, for forming it into packets, and for sending them.

The ground station 1 further comprises a multiplexer 44 for time-axis multiplexing (time-division multiplexing) each data and information from each of the systems 39, 43A, 43B, 41, and 42 and for encrypting it by using key information from the key information server 10 (FIG. 1), and a radio-wave sending system 45 for performing a predetermined process on the output of this multiplexer 44 and then for transmitting it toward the satellite 2 from an antenna (not shown).

In the ground station 1 constructed in this manner, the material data from the television program material entry system 31 is entered into the AV server 35. This material data is video data and audio data. The material data entered into the AV server 35 is sent to the television program sending system 39 whereby the video data is compressed by, for example, an MPEG2 method, and the audio data is compressed by, for example, an MPEG audio method, each being formed into packets. The output of the television program sending system 39 is sent to the multiplexer 44.

Furthermore, the audio data from the piece-of-music material entry system 32 is supplied to the MPEG audio encoder 36A and the ATRAC encoder 363 whereby the audio data are each encoded, after which the data is entered into each of the MPEG audio server 40A and the ATRAC audio server 40B. The MPEG audio data entered into the MPEG audio server 40A is sent to the MPEG audio sending system 43A whereby it is formed into packets, after which these packets are sent to the multiplexer 44. The ATRAC data entered into the ATRAC audio server 40B is sent, as 4x-speed ATRAC data, to the ATRAC audio sending system 43B whereby it is formed into packets, after which these packets are sent to the multiplexer 44.

Furthermore, the additional audio information from the additional audio information entry system 33 is entered into the additional audio information database 37. The additional audio information entered into the additional audio information database 37 is sent to the additional audio information sending system 41 whereby the additional audio information is formed into packets, after which these packets are sent to the multiplexer 44.

Furthermore, the GUT data from the material-for-GUI entry system 34 is entered into the GUT material database 38. The GUI data entered into the GUT material database 38 is sent to the GUT authoring system 42 whereby data for a screen for GUT is processed and formed into packets, after which these packets are sent to the multiplexer 44. Here, examples of the GUI data include the still-image information of the jacket, the lyrics information of the piece of music, the concert information of the artist, etc. Here, the still-image information is image data of 640 (480 pixels, which is compressed by, for example, a JPEG (Joint Photographic Coding Experts Group) method, and the lyrics information is text data, for example, up to 800 characters, the information being formed into packets.

In the multiplexer 44, video packets and audio packets from the television program sending system 39, audio packets from the MPEG audio sending system 43A, 4x-speed audio packets from the ATRAC audio sending system 43B, additional audio information packets from the additional audio information sending system 41, and GUI data packets from the GUI authoring system 42 are time-axis multiplexed and encrypted using key information from the key information server 10 (FIG. 1).

The output of the multiplexer 44 is sent to the radio-wave sending system 45 whereby it is subjected to a process, such as addition of an error-correction code, modulation, frequency conversion, etc., after which it is transmitted toward the satellite 2 from the antenna (not shown).

Figure 4:
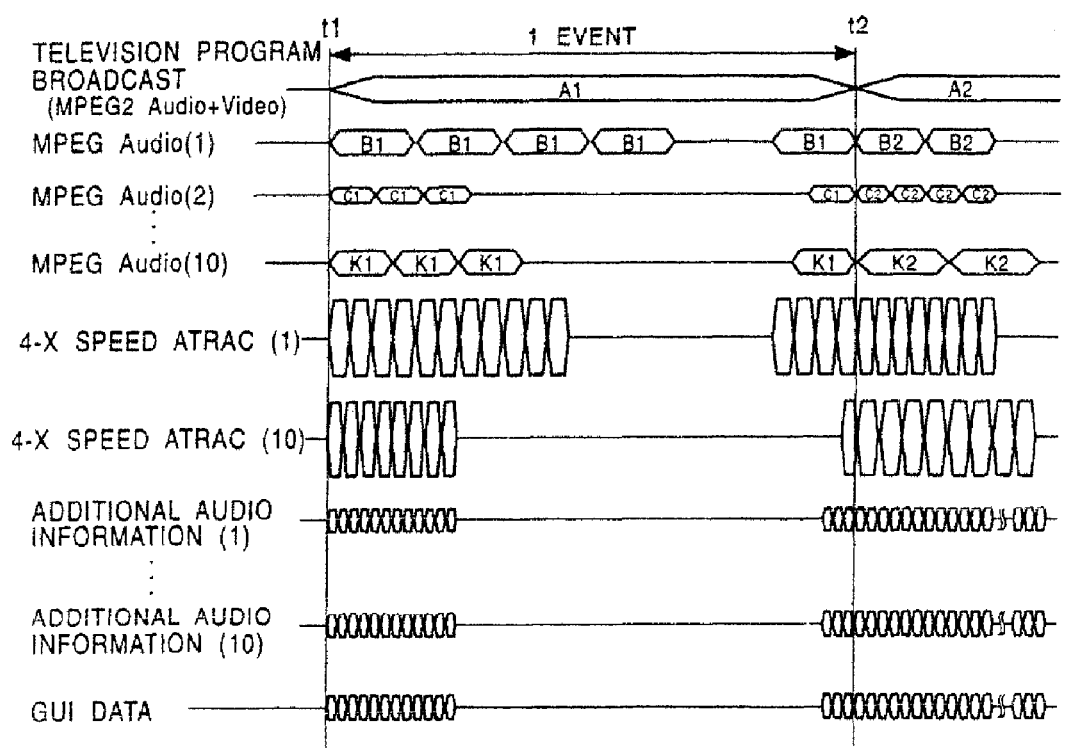
FIG. 4 is an illustration showing the structure of an example of data transmitted in the system shown in FIG. 1.
Figure 5:
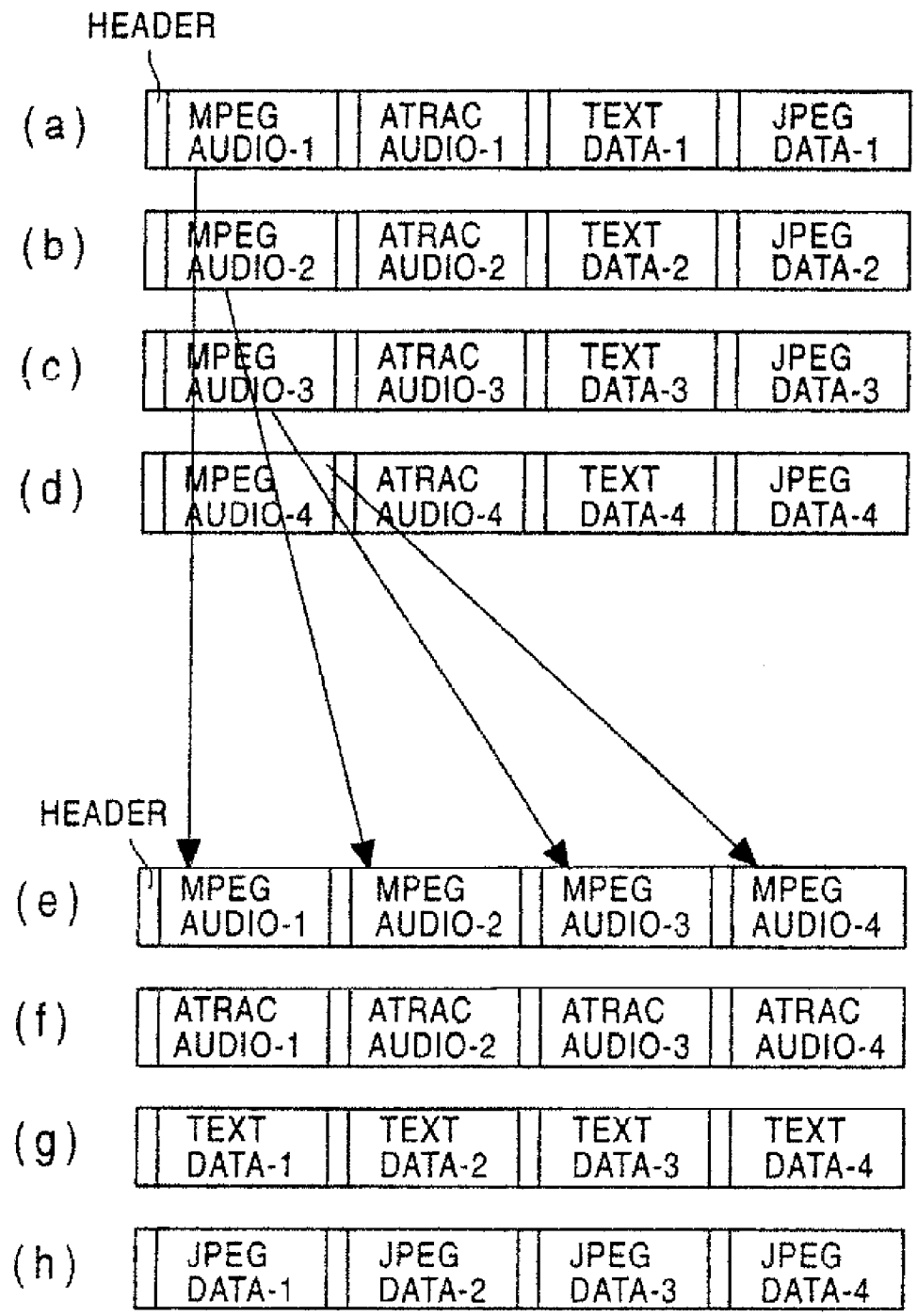
FIGS. 5A, 5B, 5C, 5D, 5E, 5F, 5G, and 5H are illustrations showing a method for transmitting various types of data and a method for reconstructing them in the system shown an FIG. 1.

FIG. 4 shows an example of data transmitted from the ground station 1. Each data shown in this figure is time-axis multiplexed in practice. As shown in FIG. 4, the duration from time t1 to time t2 is one event, and the duration from time t2 is the next event. The event is a unit in which the line-up of the pieces of music is changed, and it is common practice for a unit to be 30 minutes or one hour. For example, it is conceivable that the pieces of music from the 20th place to the 11th place of the top 20 of the current hit songs are broadcast in an earlier event, and the pieces of music from the 10th place to the first place are broadcast in a later event.

As shown in FIG. 4, in the event from time t1 to time t2, a music program having a predetermined content A1 is broadcast in the normal program broadcast for moving pictures. Also, in the event starting from time t2, a music program having a predetermined content A2 is broadcast. Moving pictures and audio are broadcast in this normal music program.

For the audio channels, for example, ten channels from channel CH1 to CH10 are prepared. At this time, in each of the audio channels CH1, CH2, CH3, ... CH10, the same piece of music is repeatedly transmitted during one event. That is, in the event from time t1 to time t2, in the audio channel CH1, a piece of music B1 is repeatedly transmitted, in the audio channel CH2, a piece of music C1 is repeatedly transmitted, and hereafter, in a similar manner, in the audio channel CH10, a piece of music K1 is repeatedly transmitted. In the event starting from time t2, in the audio channel CH1, a piece of music B2 is repeatedly transmitted, in the audio channel CH2, a piece of music C2 is repeatedly transmitted, and hereafter, in a similar manner, in the audio channel CH10, a piece of music K2 is repeatedly transmitted. This is common to the MPEG audio channel and the 4x-speed ATRAC audio channel.

In other words, in FIG. 4, those in which the numerals within the parentheses, which are the channel numbers of the MPEG audio channel and the 4x-speed ATRAC audio channel, are related to the same piece of music. Also, the numeral within the parenthesis, which is the channel number of the additional audio information, is additional audio information added to the audio data having the same channel number. Furthermore, the still-image data and the text data transmitted as GUI data are also formed for each channel.

FIGS. 5A, 5B, 5C, 5D, 5E, 5F, 5G, and 5H show a method for transmitting various types of data such as those shown in FIG. 4 and a method for reconstructing them. As shown in FIGS. 5A to 5D, various types of data are time-division multiplexed by transport packets of MPEG2 and are transmitted. Each transport packet has a header, and information indicating the type of packet is described within this header. Within the IRD 12, using information indicating the type of packet within the header of each packet, each data is reconstructed, as shown in FIGS. 5E to 5H.

Next, a description is given of the receiving equipment 3 in each household. As shown in FIG. 1, as receiving equipment of each household, the parabolic antenna 11, the IRD 12, the storage device 13, and the television receiver 14 are prepared.

Figure 6A:
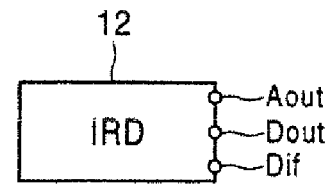
FIGS. 6A, 6B, 6C, and 6D are illustrations showing the relationship between an IRD (integrated receiver decoder) and various storage devices in the system shown in FIG. 1.

Here, it is assumed that, as shown in FIG. 6A, the IRD 12 comprises an analog audio output terminal Aout, a digital audio output terminal Dout of IEC958, etc., which sends audio data through an optical cable, and a digital interface terminal Dif of IEEE1394, etc. Therefore, as the storage device 13, as shown in FIG. 6B, a storage device comprising only an analog audio input terminal Ain may be connected; as shown in FIG. 6C, a storage device comprising a PCM audio input terminal Din of IEC958, etc., may be connected; and as shown in FIG. 6D, a storage device comprising a two-way digital interface terminal Dif of IEEE1394, etc., may be connected.

Figure 6B:
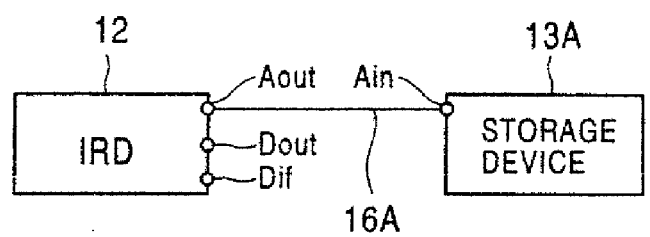

As shown in FIG. 6B, when a storage device 13A comprising only the analog audio input terminal Ain is used as a storage device, the analog output terminal Aout of the IRD 12 is connected to the analog input terminal Ain of the storage device 13A through an analog cable 16A.

Figure 6C:
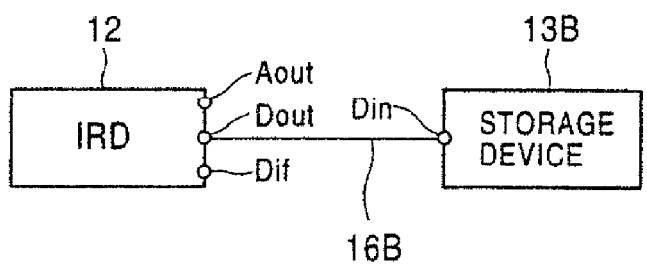

Furthermore, as shown in FIG. 6C, when a storage device 13B comprising the PCM audio input terminal Din of IEC958, etc., is used as a storage device, the section between the digital audio output terminal Dout of the IRD 12 and the digital input terminal Din of the storage device 13B is connected by, for example, an optical cable 16B of IEC958.

Figure 6D:
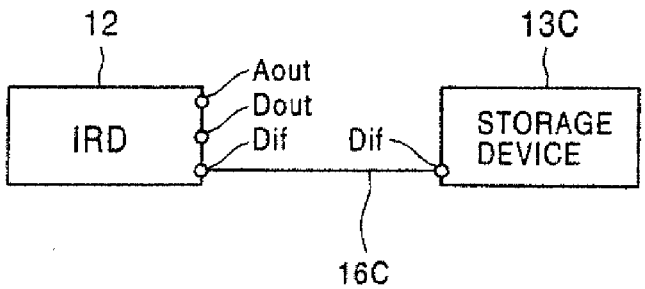

Furthermore, as shown in FIG. 6D, when a storage device 13C comprising the two-way digital interface terminal Dif of IEEE1394, etc., is used as a storage device, the section between the digital interface terminal Dif of the IRD 12 and the digital interface terminal Dif of the storage device 13C is connected by, for example, a digital interface cable (hereinafter referred to as an "IEEE1394 bus") 16C of IEEE1394.

As shown in FIG. 6B, when a storage device which does not comprise a digital input terminal is used as a storage device, the downloaded MPEG audio data is subjected to a decoding process of MPEG within the IRD 12, is further converted from digital to analog form, and is output from the analog audio output terminal Aout. Then, the data is sent to the storage device 13A from the IRD 12 through the analog cable 16A. In this case, the construction may also be formed in such a way that a control signal is exchanged between the IRD 12 and the storage device 13A using wireless communication via infrared rays or using wired communication through cables, and confirmation of the connection relationship and confirmation of the downloading operation are performed.

As shown in FIG. 6C, when the storage device 13B comprising the PCM audio input terminal Din is used as a storage device, the downloaded MPEG audio data is subjected to a decoding process of MPEG within the IRD 12 and is output as PCM audio data from the IRD 12. Then, the data is sent from the IRD 12 to the storage device 13B through, for example, the optical cable 16B of IEC958. Also in this case, the construction may also be formed in such a way that a control signal is exchanged between the IRD 12 and the storage device 13A using wireless communication via infrared rays or using wired communication through cables, and confirmation of the connection relationship and confirmation of the downloading operation are performed.

As a specific example in the case shown in FIG. 6D, when an MD recorder-player (hereinafter referred to as an "IEEE1394MD") comprising the two-way digital interface terminal Dif of IEEE1394, etc., is used as the storage device 13C, the downloaded 4×-speed ATRAC data is sent from the IRD 12 as it is to the storage device 13C through the IEEE1394 bus 16C. Also, the IEEE1394MD as the storage device 13C can store, together with the audio data of the piece of music selected by the IRD 12, text data, such as the jacket data, the lyrics data, etc. In the following description, the IEEE1394MD as the storage device 13C is also given the reference numeral 13C.

In a manner as described above, as an apparatus used as the storage device 13, there can be mentioned three types of apparatuses: apparatuses for analog input, apparatuses which input PCM audio data, and apparatuses which input ATRAC data.

Figure 7:
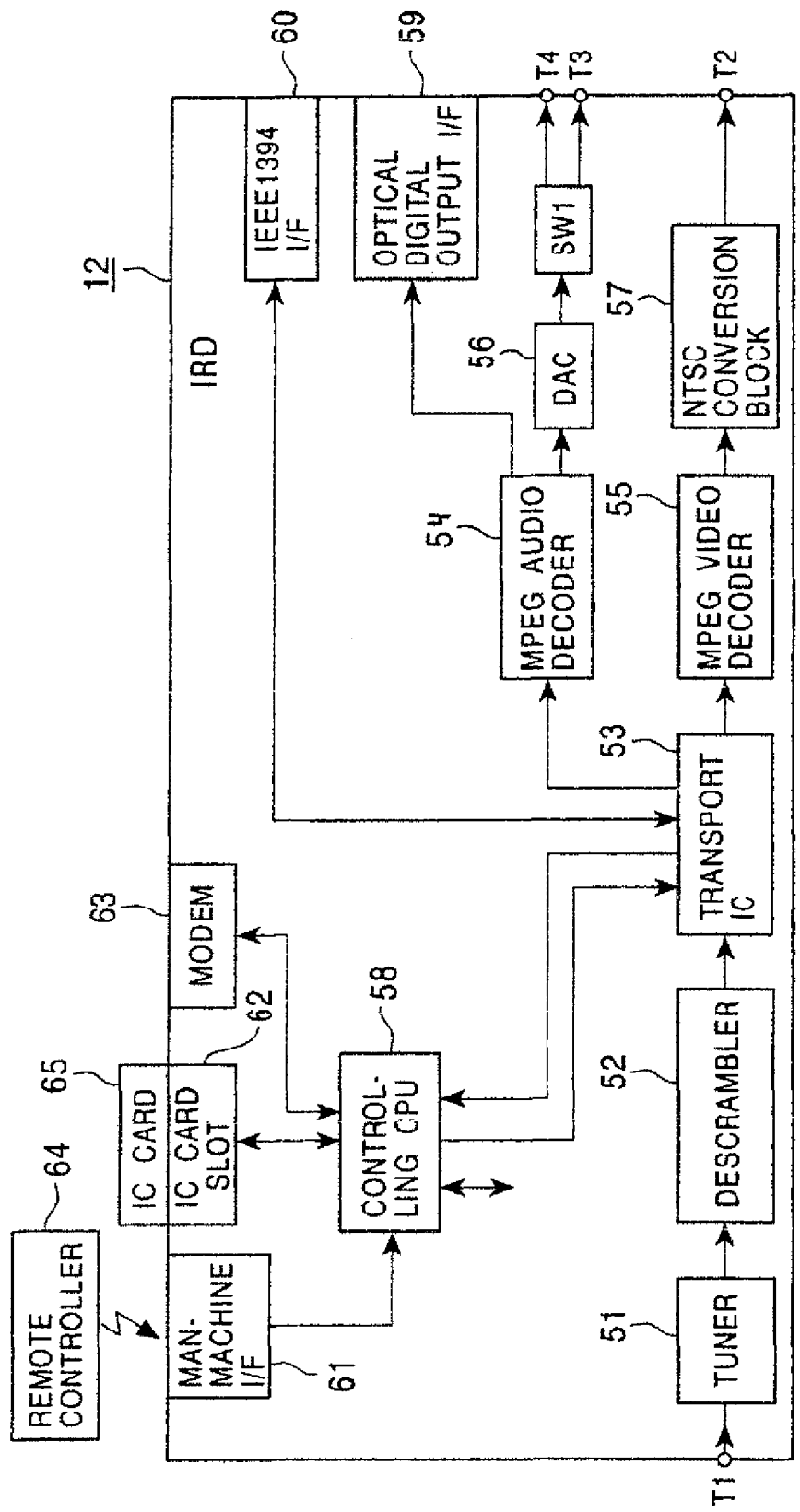
FIG. 7 is a block diagram showing an example of the construction of the IRD in the system shown in FIG. 1.

FIG. 7 shows an example of the construction of the IRD 12. This IRD 12 comprises, as external terminals or interfaces, an input terminal T1, an analog video output terminal T2, analog audio output terminals T3 and T4, an optical digital output interface 59, an IEEE1394 interface 60, a man-machine interface 61, an IC card slot 62, and a modem 63. Also, the IRD 12 comprises a controlling CPU (central processing unit) 58.

The input terminal T1 is a terminal to which is input a received signal which has been converted into a predetermined frequency by the LNB 25. The analog video output terminal T2 is a terminal which supplies an analog video signal to the television receiver 14. The analog audio output terminal T3 is a terminal which supplies an analog audio signal to the television receiver 14. The analog audio output terminal T4 is a terminal which supplies an analog audio signal to a storage device for analog input. The optical digital output interface 59, which complies with the IEC958, sends PCM audio data to the optical cable 16B. The IEEE1394 interface 60 sends video data, audio data, and various types of commands, etc., to the IEEE1394 bus 16C. The man-machine interface 61 sends an input from the remote controller by the user to the controlling CPU 58. The IC card 65 is inserted into the IC card slot 62. The modem 63 is connected to the account server 5 over the telephone line 4.

The IRD 12 further comprises a tuner 51 connected to the input terminal T1, a descrambler 52 provided at a stage subsequent to this tuner 51, a transport IC (integrated circuit) 53 provided at a stage subsequent to this descrambler 52, an MPEG audio decoder 54 and an MPEG video decoder 55 which are provided at a stage subsequent to this transport IC 53, a digital-analog converter 56 provided at a stage subsequent to the MPEG audio decoder 54, a one-input two-output switch SW1 provided at a stage subsequent to this digital-analog converter 56, and an NTSC (National Television System Committee) conversion block 57 provided at a stage subsequent to the MPEG video decoder 55.

The output end of the NTSC conversion block 57 is connected to the analog video output terminal T2. Each output end of the switch SW1 is connected to the analog audio output terminals T3 and T4, respectively Also, the MPEG audio decoder 54 is connected to the optical digital output interface 59. Also, the transport IC 53 is connected to the IEEE1394 interface 60.

The tuner 51 selects a signal of a predetermined receiving frequency from among the received signals supplied from the analog terminal T1 in accordance with a setting signal from the controlling CPU 58, further performs a demodulation process and an error-correction process thereon, and outputs an MPEG transport stream. The descrambler 52 receives the MPEG transport stream from the tuner 51, receives key data for descrambling stored in the IC card 65 via the IC card slot 62 and the controlling CPU 58, and performs descrambling using this key data. The transport IC 53 receives a command input from the remote controller 64 by the user via the man-machine interface 61 and the controlling CPU 58, and extracts MPEG video data and MPEG audio data of a desired television program from the transport stream. The MPEG video decoder 55 converts the MPEG video data supplied from the transport IC 53 into the video data before the data is compressed. The MPEG audio decoder 54 converts the MPEG audio data supplied from the transport IC 53 into the audio data (PCM audio data) before the data is compressed. The digital-analog converter 56 converts the audio data supplied from an MPEG audio decoder 54A into analog audio signals. The switch SW1 selectively supplies the analog audio signal supplied from the digital-analog converter 56 to the analog audio output terminals T3 and T4.

The controlling CPU 58 performs the processing of the entire IRD 12. Also, the controlling CPU 58 receives a command input to the controlling CPU 58 by the user using the remote controller 64 via the man-machine interface 61. The modem 63 is connected to the controlling CPU 58. Information required for accounting is stored in the IC card 65. The information in this IC card 65 is sent to the account server 5 (FIG. 1) using the modem 63 via the telephone line 4

Furthermore, the transport IC 53 inputs additional audio information and GUI data shown in FIG. 4 from the transport stream and sends them to the controlling CPU 58. Based on this data, the controlling CPU 58 forms a screen for a list page, a screen for an information page of each piece of music, screen data for an EPG, etc. The screen data formed in this manner is written into a predetermined area of a buffer memory within the MPEG video decoder 55. As a result, as shown in FIG. 2, a screen for a list page of pieces of music being broadcast and an information page of each piece of music or a screen for an EPG can be displayed in a specified area on the screen.

Next, a description is given of the operation of the IRD 12 shown in FIG. 7.

In the IRD 12 shown in FIG. 7, when the channel of the music content streaming system which has been described thus far is selected by the user, a GUI screen such as that shown in FIG. 2 is displayed on the screen of the television receiver 14.

At this time, the received signal input to the terminal T1 is supplied to the tuner 51. In the tuner 51, a signal of a predetermined receiving frequency is selected from the received signals in accordance with the setting signal from the controlling CPU 58, and further, a demodulation process and an error-correction process are performed thereon, and an MPEG transport stream is output.

The output of the tuner 51 is supplied to the descrambler 52. In the descrambler 52, key data used for descrambling stored in the IC card 65 is input via the IC card slot 62 and the controlling CPU 58, and descrambling of the MPEG transport stream is performed by using this key data. The descrambled MPEG transport stream is sent to the transport IC 53.

A command input from the remote controller 64 by the user is input to the transport IC 53 via the man-machine interface 61 and the controlling CPU 58. The transport IC 53 extracts, in accordance with the command, the MPEG video data and the MPEG audio data of a desired television program from the transport stream, and sends them to the MPEG video decoder 55 and the MPEG audio decoder 54, respectively.

The MPEG video data sent to the MPEG video decoder 55 is converted hereby into the video data before the data is compressed; next, it is converted into a composite video signal by the NTSC conversion block 57, after which it is output from the analog video output terminal T2 to the television receiver 14. The MPEG audio data sent to the MPEG audio decoder 54 is converted hereby into the audio data before the data is compressed; next, it is converted into an analog audio signal by the digital-analog converter 56, after which it is output from the analog audio output terminal T3 to the television receiver 14.

In a case in which a piece of music is selected from the list 21B of the pieces of music on the GUI screen shown in FIG. 2 and the audio data of the piece of music is to be test-listened, the MPEG audio data is extracted in the transport IC 53, this MPEG audio data is decoded by the MPEG audio decoder 54, and it is converted from digital to analog form by the digital-analog converter 56, after which it is passed through the switch SW1 and is output from the analog audio output terminal T3 to the television receiver 14.

Furthermore, when the download button 28 is pressed on the GUI screen shown in FIG. 2 in order to download the audio data, the audio data is extracted in the transport IC 53, and the audio data is output from one of the analog audio output terminal T4, the optical digital output interface 59, and the IEEE1394 interface 60.

Here, as shown in FIG. 6D, in a case in which the IEEE1394MD 13C is connected to the IEEE1394 interface 60 (the digital interface terminal Dif), 4×-speed ATRAC data is extracted in the transport IC 53 and is sent to the IEEE1394MD 13C via the IEEE1394 interface 60. Also, at this time, jacket data which is compressed by the JPEG method is extracted in the transport IC 53 and is sent to the IEEE1394MD 13C via the IEEE1394 interface 60. Furthermore, at this time, text data, such as the lyrics or the profile of the artist, is extracted in the transport IC 53 and is sent to the IEEE1394MD 13C via the IEEE1394 interface 60.

In a case in which a storage device 13B (FIG. 6C) which is not provided with IEEE1394 interface, is connected to the optical digital output interface 59, MPEG audio data is extracted in the transport IC 53, and is decoded by the MPEG audio decoder 54, after which the PCM audio data is sent to the storage device 13B via the optical digital output interface 59 (digital output terminal Dout).

In a case in which a storage device 13A (FIG. 6A) which can input only analog audio is connected to the analog audio output terminal T4, MPEG audio data is extracted in the transport IC 53, is decoded by the MPEG audio decoder 54, and is further converted from digital to analog form by the digital-analog converter 56, after which it is passed through the switch SW1 and is sent to the storage device 13A from the analog audio output terminal T4 (audio output terminal Aout).

In this embodiment, in a case in which ATRAC data as specific data is contained in the piece-of-music data and this ATRAC data is transferred to another apparatus, the IRD 12 performs an authentication process for confirming the validity of the apparatus of the transfer destination and sends the data to the apparatus of the transfer destination only when the validity is confirmed. The apparatus having the validity as a transfer destination of the ATRAC data is an apparatus for which transfer of data is permitted in advance, and in this embodiment, the IEEE1394MD 13C corresponds thereto.

Figure 8:
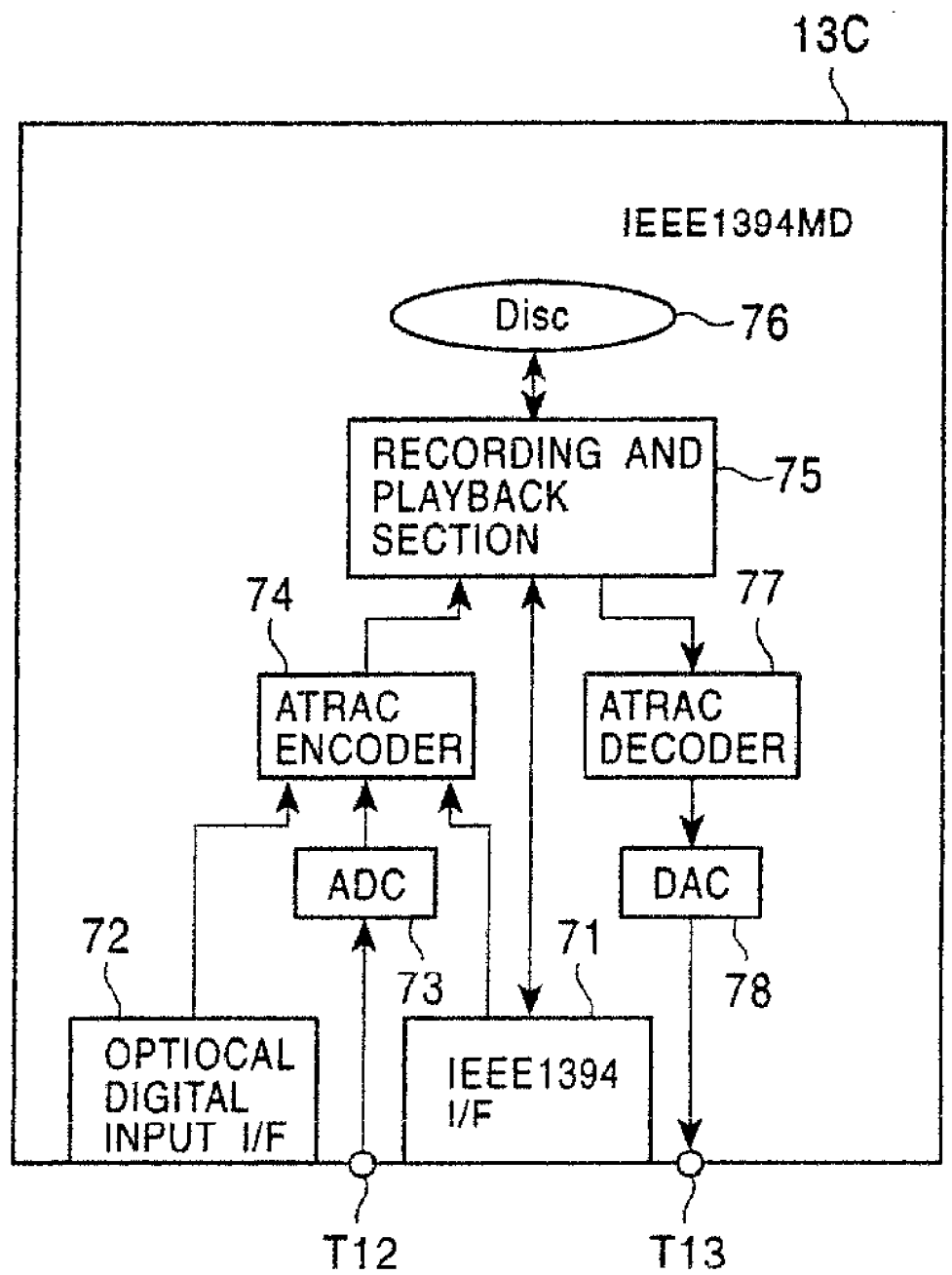
FIG. 8 is a block diagram showing an example of the construction of an IEEE1394MD in FIG. 6.

FIG. 8 is a block diagram showing an example of the construction of the IEEE1394MD 13C. This IEEE1394MD 13C comprises an IEEE1394 interface 71, an optical digital input interface 72, an analog audio input terminal T12, and an analog audio output terminal T13. The IEEE1394 interface 71 is directly connected to a recording and playback section 75 and further, is connected to the recording and playback section 75 via an ATRAC encoder 74. The optical digital input interface 72 is connected to the recording and playback section 75 via the ATRAC encoder 74. The analog audio input terminal T12 is connected to the ATRAC encoder 74 via an analog-digital converter 73. The analog audio output terminal T13 is connected to the recording and playback section 75 via a digital-analog converter 78 and an ATRAC decoder 77. A disk 76 is set in the recording and playback section 75, and the recording and playback section 75 performs recording into and playback from this disk 76. Although not shown here, this IEEE1394MD 13C is provided with a controlling CPU for performing overall control and a man-machine interface.

Next, the operation of this IEEE1394MD 13C during recording is described.

In a case in which the IEEE1394 interface 71 is connected to the IEEE1394 interface 60 of the IRD 12 shown in FIG. 7, the audio data of the piece of music, text data, such as the lyrics, and still-image data, such as the jacket, which are sent from the IEEE1394 interface 60, are input from the IEEE1394 interface 71, and the audio data is recorded into the disk 76 as it is by the recording and playback section 75. As will be described later, at this time, each of the data is recorded on the disk 76 in accordance with an expansion MD format.

In a case in which PCM audio data is input to the optical digital input interface 72 from an external source, the input PCM audio data is encoded by the ATRAC encoder 74, after which it is recorded on the disk 76 by the recording and playback section 75.

In a case in which an analog audio signal is input to the analog audio input terminal T12 from the external source, the input analog audio signal is converted from analog to digital form by the analog-digital converter 73 and is encoded by the ATRAC encoder 74, after which it is recorded on the disk 76 by the recording and playback section 75.

In other words, in this IEEE1394MD 13C, only in a case in which the section between it and the IRD 12 is connected by the IEEE1394 bus, together with the audio data of the piece of music, the lyrics data thereof, the still-image data of the jacket, etc., are recorded, and in the case of the connection by optical digital interface or in the case of analog audio input, only the audio data is recorded.

Furthermore, in the IEEE1394MD 13C, it is possible during playback to output a playback signal from the IEEE1394 interface 71 or the analog audio output terminal T13. Then, in a case in which, together with the audio data of the piece of music, the lyrics data thereof, the jacket data, etc., are recorded on the disk 76, when the playback signal is output from the IEEE1394 interface 71, the piece-of-music data can be output to an audio apparatus (amplifier, etc.) which conforms to the IEEE1394, and further, the lyrics data, the jacket data, etc., can be displayed on a display which conforms to the IEEE1394 and can be printed by a printer which conforms to the IEEE1394.

In a manner as described above, it is possible for the IEEE1394MD 13C of the present invention to record and play back the audio data of the piece of music, the lyrics data thereof, the jacket data, etc.

FIG. 9 shows the expansion MD format which makes it possible to record and play back the audio data of a piece of music, the lyrics data thereof, the jacket data thereof, etc. As shown in this figure, the audio data of the piece of music is recorded in a main data area by an ATRAC method. This is the same as the currently used MD format. In the expansion MD format, furthermore, the above-mentioned jacket data, the lyrics data, etc, are recorded in an auxiliary data (Aux Data) area of 2.8 Mbytes. Use of such an expansion MD format makes it possible to record and play back the audio data of a piece of music and further, the lyrics data, the jacket data, etc. Also, it is possible to maintain compatibility with the current MD format.

Figure 10:
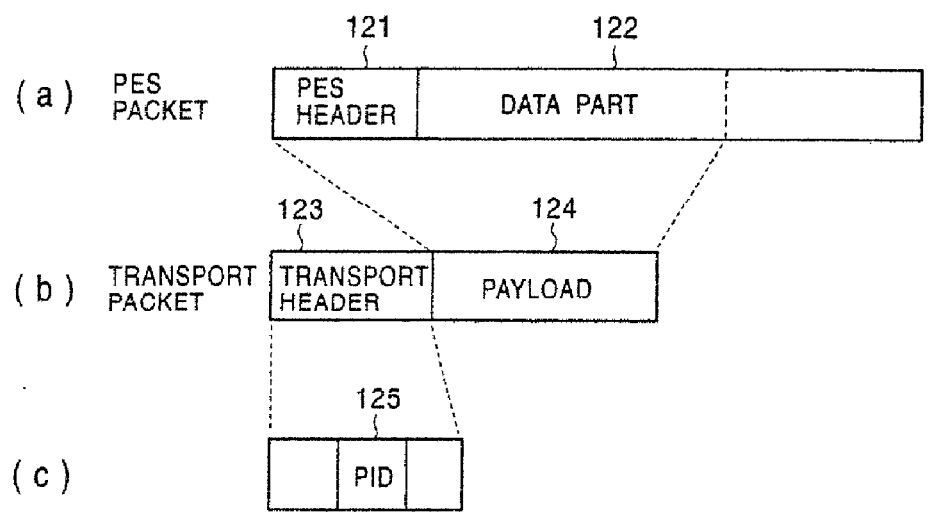
FIGS. 10A, 10B, and 10C are illustrations showing the structure of various types of data transmitted in the system shown in FIG. 1.

Next, referring to FIGS. 10A, 10B, and 10C, a description is given of the structure of various types of data transmitted in this embodiment.

In this embodiment, various types of data are transmitted by transport packets in an MPEG transport stream from the ground station 1 to the receiving equipment 3. FIG. 10B shows the data structure of this transport packet. The transport packet has a transport port header 123 in which control information is stored, and a payload 124 in which information to be transmitted is stored. The payload 124 in the transport packet is formed such that a packetized elementary stream (hereinafter referred to as a "PES") is divided for each predetermined data length. FIG. 10A shows the data structure of the PES packet which is a packet in this PES. The PES packet has a PES header 121 in which control information is stored, and a data part 122.

As shown in FIG. 10C, in the transport header 123 of the transport packet, packet identification information (hereinafter referred to as a "PID") indicating the type of packet is described.

Next, a description is given of accompanying information that accompanies a piece of music which can be downloaded in this embodiment.

In this embodiment, examples of the accompanying information include the lyrics data of a piece of music, the explanation data of the piece of music, the explanation data of the artist, data of images (images, such as the jacket photograph of the album in which the piece of music is recorded, and photographs of the artist, animation, promotional images, etc.) related to the piece of music, etc. Of these, the lyrics data of the piece of music, the explanation data of the piece of music, and the explanation data of the artist are text data, and the data of the images related to the piece of music is image data compressed by the JPEG method. This accompanying information is transmitted from the ground station 1 to the receiving equipment 3 by the accompanying data as a part of the GUI data.

The accompanying information is grouped into one file, for example, for each piece of music and for each type of data. In this embodiment, this file is called a "piece-of-music accompanying information file".

Next, a description is given of a scheme for obtaining correspondence among the selected piece of music, the additional audio information, and accompanying information such as the lyrics data. The information used to make it possible to select a piece of music by operating GUI on the screen is provided by the GUI data. This GUI data contains a plurality of types of data: the lyrics data of the piece of music, the explanation data of the piece of music, the explanation data of the artist, the image data related to the piece of music, etc. This plurality of types of data each contain data for each piece of music. A subprogram tag (hereinafter referred to as a "SPT") which is identification information of a corresponding piece of music is added to each data for each piece of music, the data for each piece of music being identified by this STP. Therefore, in the IRD 12, when a particular piece of music is selected by operating GUI on the screen, an SPT corresponding to the piece of music is obtained. Then, the IRD 12 extracts the data, the additional audio information, and the accompanying information of the selected piece of music from among the received data in accordance with this SPT.

A description is given first of a method for extracting the data and the additional audio information of the selected piece of music in accordance with the SPT. In the transport stream, in order to make it possible to take out a target channel (program) from among a plurality of channels (programs), a program association table (hereinafter referred to as a "PAT") and a program map table (hereinafter referred to as a "PMT") are multiplexed together.

A PID corresponding to the PMT for each channel is described in the PAT. The PID of the transport packet containing the PAT is set to "0". In the PMT, the PID for each type of data, such as the video data, the audio data, etc., in the channel thereof is described.

Therefore, it is possible for the IRD 12 to obtain a PAT by extracting the transport packet whose PID is "0". Furthermore, it is possible for the IRD 12 to obtain a PMT for each channel by extracting the transport packet of the PID corresponding to the PMT for each channel described in the PAT. The IRD 12 can be informed of the PID for each type of data in each channel by this PMT for each channel. In this manner, the IRD 12 can extract the video data and the audio data in the selected channel as a result of being informed of the PID for each type of data in the selected channel and by extracting the transport packets of those PIDs.

Here, a channel of a music broadcast which is capable of downloading piece-of-music data described up to this point is called a "channel of EMD (Electric Music Download)". In this embodiment, with regard to this channel of EMD, in addition to the PMT, a sub-PMT (hereinafter referred to as an "SMT") is defined. This SMT is prepared for each piece of music which can be downloaded.

Figure 11:
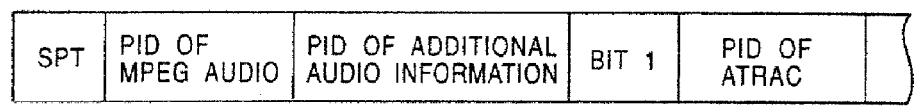
FIG. 11 is an illustration showing the data structure of an SMT in which information for each piece of music is described.

FIG. 11 is an illustration showing the detailed data structure of the SMT. In the SMT, an SPT which is identification information for each piece of music, a PID for each of MPEG audio data in the piece of music, ATRAC data, and additional audio data are described. Also, a bit (hereinafter referred to as a "BIT1") as determination data used for determining that specific data requiring authentication is contained is added before the PID of the ATRAC data. In the BIT1, a flag is set (BIT1="1"), for example, when the ATRAC data indicated by the PID is specific data requiring authentication.

Furthermore, in this embodiment, in addition to the PID for each type of data, such as video data, audio data, GUI data, etc., a PID of the SMT for each piece of music which can be downloaded is described in the PMT of the channel of the END. In this embodiment, one which describes this PID of the SMT for each piece of music which can be downloaded is called a "linkage descriptor".

The above-described data, such as the PAT, the PMT, the SMT, etc., are created by control means (not shown) in the ground station 1.

Figure 12:
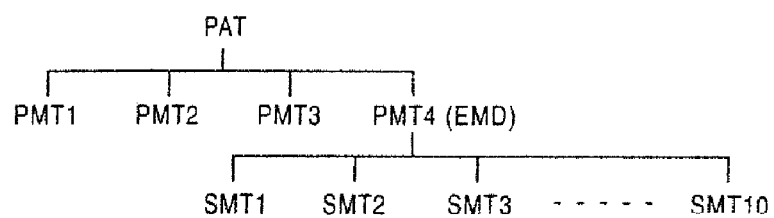
FIG. 12 is another illustration showing the structure of various types of data transmitted in the system shown in FIG. 1.

FIG. 12 conceptually shows the relationship among the above-mentioned PAT, the PMT, and the SMT. As shown in this figure, a PID corresponding to the PMT for each channel is described in the PAT. In the example shown in FIG. 12, it is assumed that the PIDs of the PMTs of four channels, that is, PMT1 to PMT4, are described in the PAT. Here, the PMT4 is assumed to be a PMT of the channel of the EMD. This PMT4 contains a plurality of linkage descriptors which describe the PID of the SMT for each piece of music which can be downloaded. In the example shown in FIG. 12, it is assumed that there are ten pieces of music which can be downloaded, and for the SMT, there are ten of SMT1 to SMT10. An SPT is added to each of the linkage descriptor and the SMT for each piece of music, and the linkage descriptor and the SMT for each piece of music can be identified by this SPT.

By such a scheme for the PAT, the PMT, and the SMT, the IRD 12 is informed of the PID of the SMT of the piece of music selected from the PMT of the channel of the EMD in accordance with the SPT of the selected piece of music when a desired piece of music is selected from among a plurality of pieces of music which can be downloaded when a channel of an EMD is selected, and is further informed of the PID for each of the MPEG audio data, the ATRAC data, and the additional audio data in the piece of music in accordance with the SMT corresponding to the PID by extracting the transport packet of those PIDs, thereby making it possible to extract the MPEG audio data, the ATRAC data, and the additional audio data in the selected channel.

Furthermore, when a desired piece of music is selected from among a plurality of pieces of music which can be downloaded when the channel of the EMD is selected, the IRD 12 extracts the accompanying information of the selected piece of music from the GUI data in accordance with the SPT of the selected piece of music.

In a manner as described above, the selected piece of music, the additional audio information, and the accompanying information, such as the lyrics data, are made to correspond to each other in accordance with the SPT.

Figure 13:
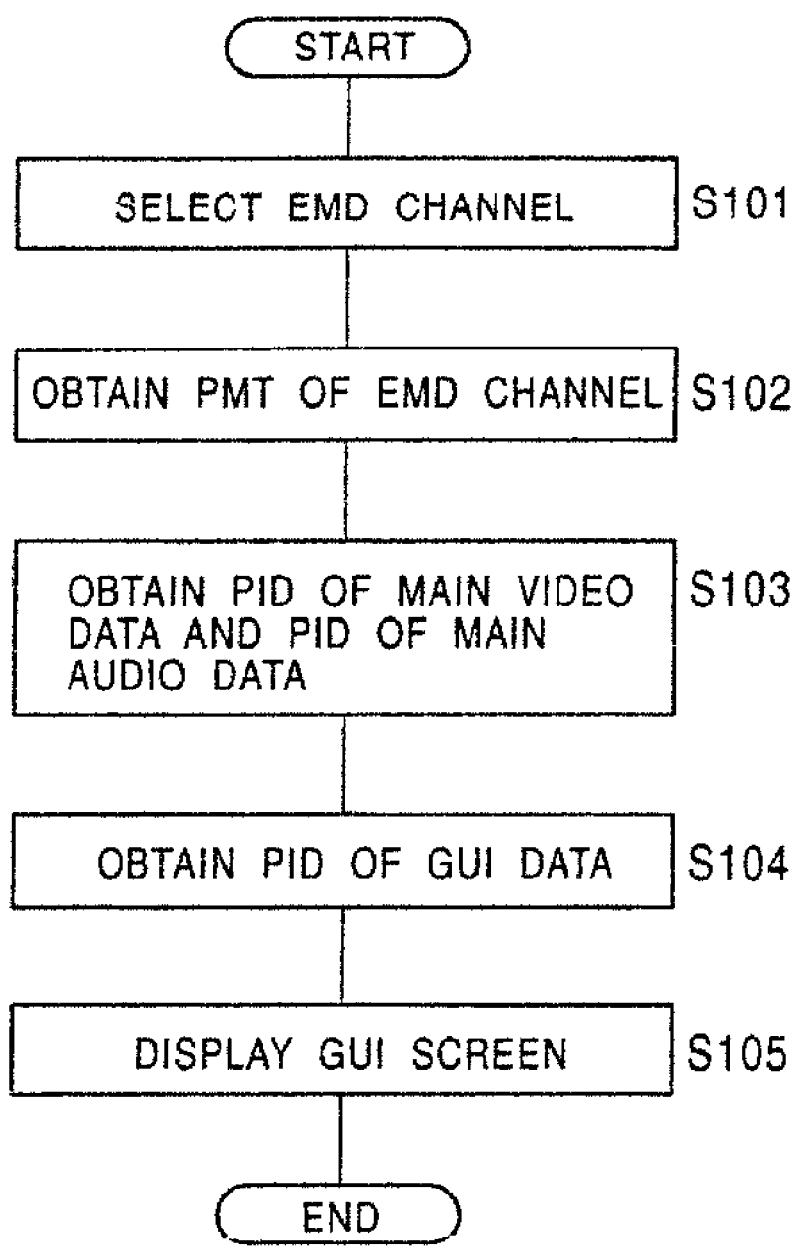
FIG. 13 is a flowchart showing the operation of the IRD up to the time a GUI (graphical user interface) screen such as that shown in FIG. 2 is displayed in an embodiment of the present invention.
Figure 14:
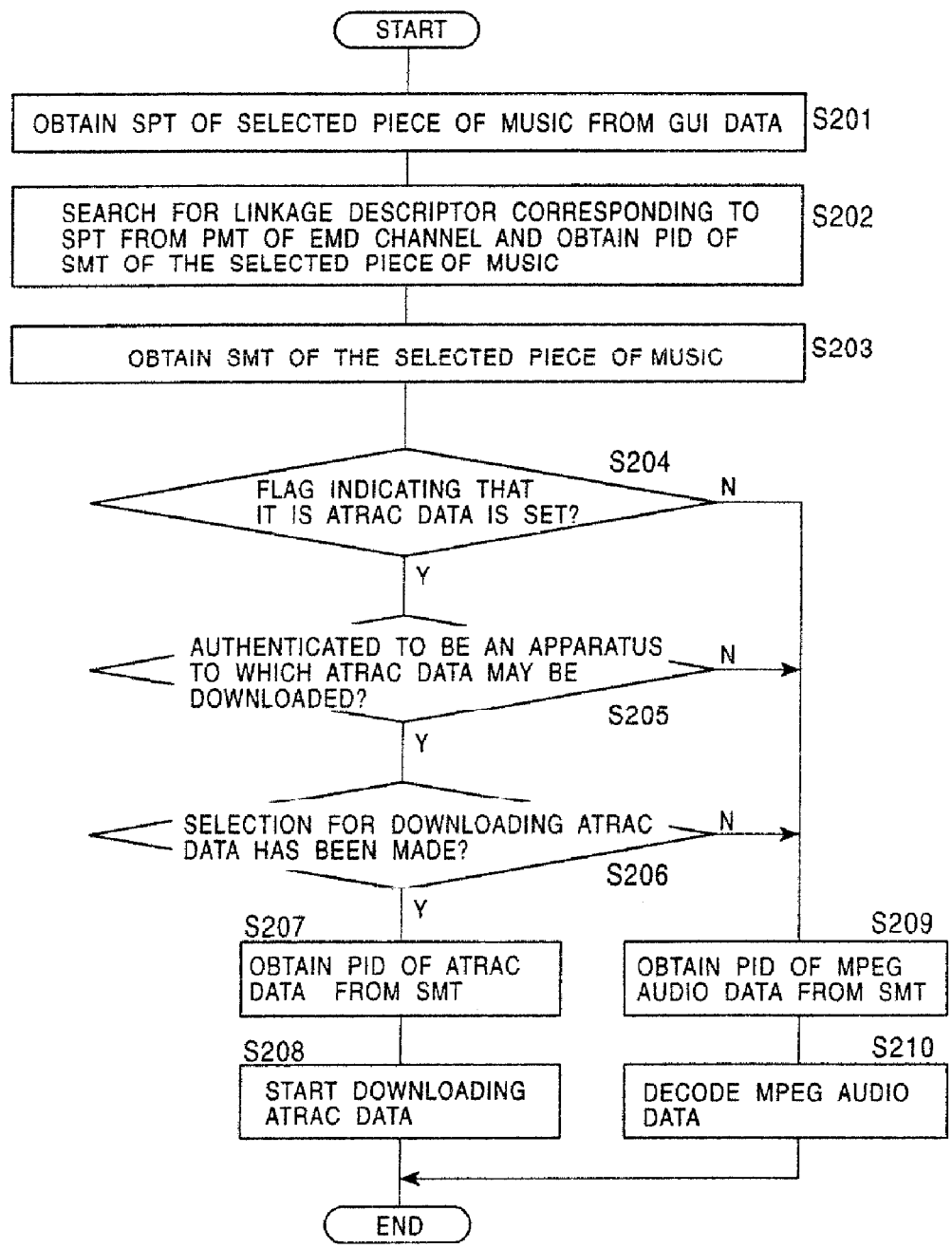
FIG. 14 is a flowchart showing the operation of the IRD in a case in which a desired piece of music is selected by using the GUI screen in the embodiment of the present invention.

Next, referring to the flowcharts of FIGS. 13 and 14, a description is given of the operation of downloading piece-of-music data in this embodiment.

FIG. 13 is a flowchart showing the operation of the IRD 12 up to the time a GUI screen such as that shown in FIG. 2 is displayed when the END channel is selected. In this operation, when the EMD channel is selected in the IRD 12 (step S101), the IRD 12 obtains the PMT of the END channel (step S102). Next, the IRD 12 obtains the PID of the main video data which is the video data of the music broadcast supplied from the television program material server 6 in FIG. 1, and the PID of the main audio data which is the audio data of the music broadcast (step S103). Next, the IRD 12 obtains the PID of the GUI data from the PMT of the EMD channel (step S104). Next, the IRD 12 extracts the transport packet having the PID of the GUI data in order to extract the GUI data from the transport stream, displays the GUI screen such as that shown in FIG. 2 in accordance with this GUI data, and extracts the main video data and the main audio data in accordance with the PID of the main video data and the PID of the main audio data in order to play back a music program (step S105), thereby terminating the operation up to the displaying of the GUI screen.

FIG. 14 is a flowchart showing the operation of the IRD 12 in a case in which a desired piece of music is selected from the list 21B of the pieces of music by using the GUI screen displayed in the above-described way. In this operation, initially, the IRD 12 obtains the SPT of the selected piece of music from the GUI data (step S201). Next, the IRD 12 searches for a linkage descriptor corresponding to the SPT from the PMT of the EMD channel and obtains the PID of the SMT of the selected piece of music (step S202). Next, the IRD 12 extracts the transport packet having the PID of the SMT of the selected piece of music in order to obtain the SMT of the selected piece of music (step S203).

Next, the IRD 12 determines whether or not the flag of the BIT1 (FIG. 11) described in the SMT has been set in order to determine whether or not ATRAC data requiring authentication is contained in the piece-of-music data (step S204). When it is determined here that the flag of the BIT1 has not been set (N), the IRD 12 extracts the MPEG audio data in accordance with this PID, obtains the PID of the MPEG audio data from the SMT (step S209), and decodes the MPEG audio data (step S210). This decoded audio data is output from the optical digital output interface 59 or from the analog audio output terminals T3 and T4.

Furthermore, when the flag of the BIT1 has been set (Y), the IRD 12 performs an authentication process between it and the apparatus (usually, the IEEE1394MD 13C) of the transfer destination of the ATRAC data, and determines whether or not the apparatus of the transfer destination is a valid apparatus to which downloading may be performed (step S205). Here, when the apparatus is not determined to be a valid apparatus (N), the IRD 12 proceeds to the process of step S209. Also, when the apparatus is determined to be a valid apparatus (Y) the IRD 12 further determines whether or not a selection for instructing that the ATRAC data be downloaded has been made by the user (step S206).

When a selection for instructing that the ATRAC data be downloaded has not been made (N), the IRD 12 proceeds to the process of step S209. Also, when a selection for instructing that the ATRAC data be downloaded has been made (Y), the IRD 12 extracts the PID of the ATRAC data from the SMT (step S207), extracts the ATRAC data in accordance with this PID, and starts downloading the ATRAC data (step S208).

Figure 15:
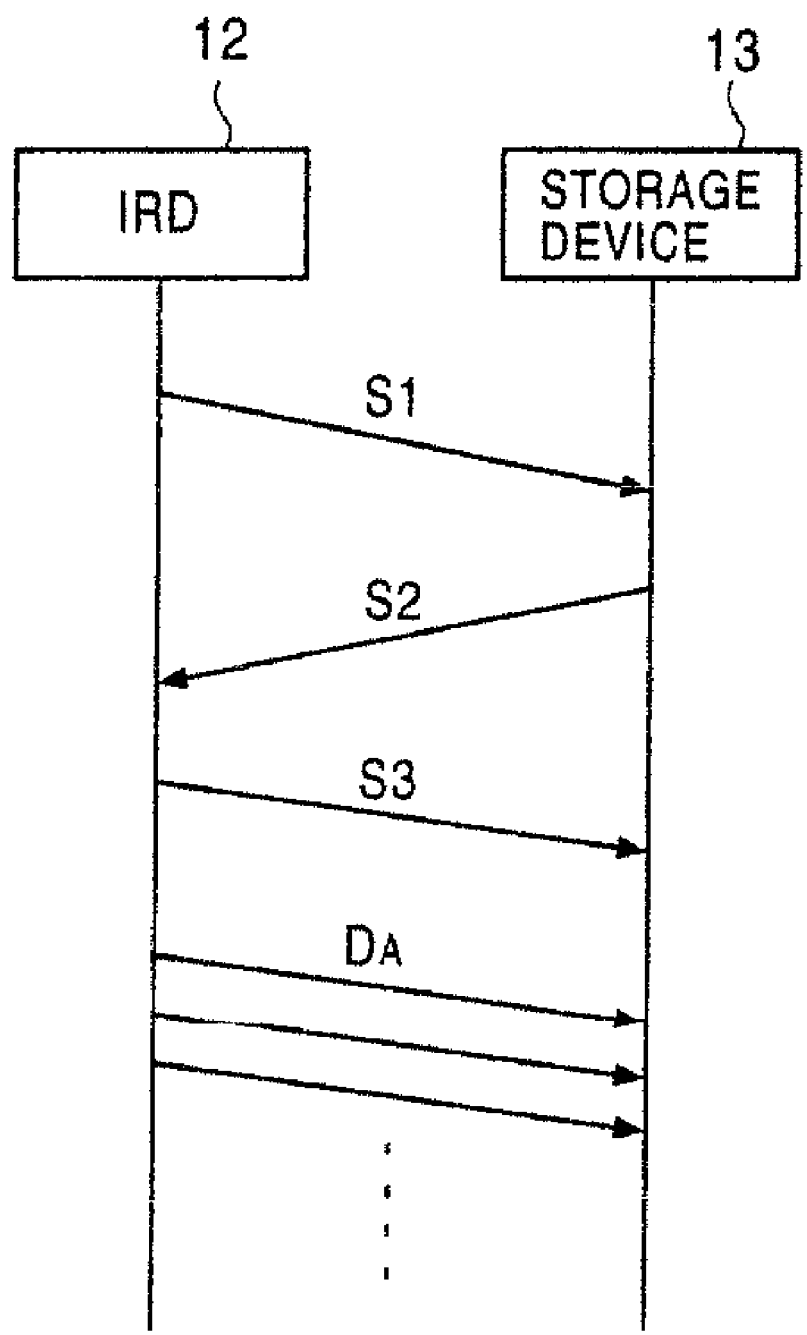
FIG. 15 is an illustration showing an example of an authentication process in the embodiment of the present invention.

Next, a description is given of an authentication process performed between the IRD 12 and the apparatus of the transfer destination for the ATRAC data in this embodiment. FIG. 15 is an illustration showing an example of an authentication process. As a method for performing authentication in this embodiment, for example, a secret-key encryption method may be used.

In the download of the ATRAC data, digital recording of such a high quality as that in which deterioration of sound quality barely occurs is possible in practice, and the protection of data is deemed to be particularly important. Therefore, in this embodiment, with the downloading of the ATRAC data, for example, an authentication process such as that described below is performed. In the following, a description is given by assuming the apparatus of the transfer destination to be the storage device 13. As shown in FIG. 15, initially, the IRD 12 transmits a command S1 requesting authentication to the storage device 13. Receiving the command S1 requesting authentication, the storage device 13 returns a command S2 as specific authentication information possessed by itself to the IRD 12. The IRD 12 determines whether or not the storage device 13 is a valid apparatus to which the data may be transferred in accordance with the command S2 from the storage device 13. The apparatus having the validity as a transfer destination is an apparatus to which the transfer of the ATRAC data is permitted, and in this embodiment, the IEEE1394MD 13C corresponds thereto. When the IRD 12 confirms that the authentication information is correct information which is set up in advance and determines that the storage device 13 is a valid apparatus, the IRD 12 transmits key information S3, then encrypts the ATRAC data in accordance with this transmitted key information S3, and transmits data DA to the storage device 13. The storage device 13 decrypts the encrypted data DA in accordance with the key information S3 transmitted in advance from the IRD 12, and records the ATRAC data.

With regard to this authentication, in addition to the authentication method described in, for example, Japanese Unexamined Patent Publication No. 8-46948, a known authentication method which is in common use may be used, and any method may be used.

As has been described up to this point, according to this embodiment, determination data used for determining that specific data (ATRAC data) requiring authentication is contained is added into the data structure of the SMT in which information for each piece of music is described and is transmitted, and on the receiving side, it is determined whether the specific data is contained in accordance with the determination data, and the IRD 12 performs a download process after performing an authentication process on the apparatus of the data transfer destination. This makes it possible to ensure the protection of the data with respect to the illicit transfer of the specific data.

Although in the above-described embodiment, determination data used for determining that specific data requiring authentication is contained is added before the PID of the ATRAC data described within the SMT, this determination data may be added into another data structure. In this case, it is preferable that this determination data be added to the place indicating that it is data for each piece of music in the data structure. In a case in which an EMD channel is simply selected, it is also possible to determine whether or not there is a PID for the ATRAC data and to perform authentication when there is a PID for the ATRAC data.

Furthermore, for example, the present invention can also be applied to a system for downloading a piece of music streamed by a ground-wave broadcast, a system for downloading a piece of music streamed by a cable broadcast, and a system for downloading a piece of music via the Internet.

As has been described up to this point, according to the data transmission apparatus of the present invention and the data transmission method of the present invention, a plurality of types of transmission data are created, and when specific data requiring, in the transmission destination, an authentication process for confirming the validity of the apparatus of the data transfer destination, is contained in this transmission data, determination data used for determining that the specific data is contained is created, and the created data is transmitted. This yields the advantage that the protection of data against illicit transfer with respect to the specific data can be ensured.

Furthermore, according to the data receiving apparatus of the present invention and the data receiving method of the present invention, a plurality of types of transmission data are received, and when specific data requiring an authentication process for confirming the validity of the apparatus of the data transfer destination is contained in this transmission data, determination data used for determining that the specific data is contained is received, and a determination is made as to whether or not the specific data is contained in the transmission data in accordance with the received determination data. This yields the advantage that the protection of data against illicit transfer with respect to the specific data can be ensured.

Furthermore, according to the data transmission and reception system of the present invention and the data transmission and reception method of the present invention, a plurality of types of transmission data is created, and when specific data requiring, in the transmission destination, an authentication process for confirming the validity of the apparatus of the data transfer destination is contained in this transmission data, determination data used for determining that the specific data is contained is created, the created data is transmitted, the transmitted data is received, and a determination is made as to whether or not the specific data is contained in the transmission data in accordance with the determination data contained in the received data. This yields the advantage that the protection of data against illicit transfer with respect to the specific data can be ensured.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

The invention claimed is:

1. A receiving apparatus, comprising:
    a receiver configured to receive digital data including at least one content program, jacket image data associated with the at least one content program, and text data associated with the at least one content program;
    an external digital data interface configured to connect to an external storage device and to enable communication with the external storage device;
    an authentication unit configured to determine whether the external storage device can be authenticated before transferring the at least one content program from the receiving apparatus to the external storage device via the external digital data interface; and
    a transfer unit configured to transfer the at least one content program, the jacket image data, and the text data to the external storage device when the external storage device is authenticated.

2. The receiving apparatus of claim 1, wherein the transfer unit is configured to transfer the at least one content program, the jacket image data, and the text data to the external storage device only when the external storage device is authenticated.

3. The receiving apparatus of claim 1, further comprising:
    a display unit configured to display a list of a plurality of content programs; and an input unit configured to receive a user selection of the at least one content program from the displayed list of the plurality of content programs.

4. The receiving apparatus of claim 3, wherein the receiver is configured to receive the digital data in response to the input unit receiving the user selection of the at least one content program from the displayed list of the plurality of content programs.

5. The receiving apparatus of claim 1, wherein the authentication unit is configured to request authentication information stored in the external storage device and determine whether the external storage device can be authenticated based on the authentication information stored in the external storage device.

6. A method of a receiving apparatus for transferring data, comprising:
    receiving digital data including at least one content program, jacket image data associated with the at least one content program, and text data associated with the at least one content program;
    determining, by the receiving apparatus, whether an external storage device can be authenticated before transferring the at least one content program from the receiving apparatus to the external storage device via an external digital data interface that is configured to connect to the external storage device and to enable communication with the external storage device; and
    transferring, by the receiving apparatus, the at least one content program, the jacket image data, and the text data to the external storage device when the external storage device is authenticated.

7. The method of claim 6, wherein the transferring step comprises:
    transferring the at least one content program, the jacket image data, and the text data to the external storage device only when the external storage device is authenticated.

8. The method of claim 6, further comprising:
    displaying a list of a plurality of content programs; and
    receiving a user selection of the at least one content program from the displayed list of the plurality of content programs.

9. The method of claim 8, wherein the step of receiving the digital data comprises:
    receiving the digital data in response to the step of receiving the user selection receiving the user selection of the at least one content program from the displayed list of the plurality of content programs.

10. The method of claim 6, further comprising:
    requesting authentication information stored in the external storage device, wherein the step of determining comprises:
    determining whether the external storage device can be authenticated based on the authentication information stored in the external storage device.

11. A non-transitory computer-readable storage medium having embedded therein instructions, which when executed by a computer, cause the computer to perform a method comprising:
    receiving digital data including at least one content program, jacket image data associated with the at least one content program, and text data associated with the at least one content program;
    determining whether an external storage device can be authenticated before transferring the at least one content program from the computer to the external storage device via an external digital data interface that is configured to connect to the external storage device and to enable communication with the external storage device; and
    transferring the at least one content program, the jacket image data, and the text data to the external storage device when the external storage device is authenticated.

12. The non-transitory computer-readable storage medium of claim 11, wherein the transferring step comprises:
    transferring the at least one content program, the jacket image data, and the text data to the external storage device only when the external storage device is authenticated.

13. The non-transitory computer-readable storage medium of claim 11, further comprising:
    displaying a list of a plurality of content programs; and
    receiving a user selection of the at least one content program from the displayed list of the plurality of content programs.

14. The non-transitory computer-readable storage medium of claim 13, wherein the step of receiving the digital data comprises:
    receiving the digital data in response to the step of receiving the user selection receiving the user selection of the at least one content program from the displayed list of the plurality of content programs.

15. The non-transitory computer-readable storage medium of claim 11, further comprising:
    requesting authentication information stored in the external storage device, wherein the step of determining comprises:
    determining whether the external storage device can be authenticated based on the authentication information stored in the external storage device.

16. The receiving apparatus of claim 1, wherein the external storage device is configured to store and play back the at least one content program.

17. The receiving apparatus of claim 1, wherein the content program is a piece of music, and the jacket image data is still-image data of an album jacket corresponding to the piece of music.

* * * * *